US012386828B2

(12) United States Patent
Ding et al.

(10) Patent No.: US 12,386,828 B2
(45) Date of Patent: Aug. 12, 2025

(54) QUERY TASK EXECUTION METHOD, APPARATUS, COMPUTER DEVICE AND STORAGE MEDIUM

(71) Applicant: Beijing Volcano Engine Technology Co., Ltd., Beijing (CN)

(72) Inventors: Wei Ding, Los Angeles, CA (US); Yuanjin Lin, Beijing (CN); Jianfeng Qian, Los Angeles, CA (US); Li Zhang, Los Angeles, CA (US); Jianjun Chen, Los Angeles, CA (US); Rui Shi, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/746,962

(22) Filed: Jun. 18, 2024

(65) Prior Publication Data

US 2025/0021552 A1    Jan. 16, 2025

(30) Foreign Application Priority Data

Jul. 13, 2023   (CN) .......................... 202310857076.5

(51) Int. Cl.
*G06F 16/00* (2019.01)
*G06F 9/48* (2006.01)
(Continued)

(52) U.S. Cl.
CPC ...... *G06F 16/24532* (2019.01); *G06F 9/4881* (2013.01); *G06F 16/144* (2019.01);
(Continued)

(58) Field of Classification Search
CPC ........... G06F 16/24532; G06F 16/2282; G06F 16/248; G06F 16/144; G06F 16/2315;
(Continued)

(56) References Cited

U.S. PATENT DOCUMENTS 6,009,265 A    12/1999  Huang et al.
6,223,205 B1 *  4/2001  Harchol-Balter ....... G06F 9/505
                                                       718/105
(Continued)

FOREIGN PATENT DOCUMENTS

CN    101908003 A    12/2010
CN    113961581 A     1/2022
(Continued)

OTHER PUBLICATIONS

Harshad Deshmukh et al., "Adaptive Concurrent Query Execution Framework for an Analytical In-Memory Database System", 2017 IEEE International Congress on Big Data (BigData Congress) (Jun. 2017, pp. 23-30).*

(Continued)

*Primary Examiner* — Srirama Channavajjala

(57) ABSTRACT

This disclosure provides a query task execution method, apparatus, computer device, storage medium. The method includes: receiving a query task for a target data table; determining at least one candidate degree of parallelism for executing the query task based on a first number of child tables obtained by pre-partitioning the target data table; selecting a target degree of parallelism within a preset range of degrees of parallelism from the at least one candidate degree of parallelism; and determining required computing units according to the target degree of parallelism, and evenly allocating the child tables to the computing units which concurrently execute the query task based on the allocated child tables.

17 Claims, 2 Drawing Sheets

(51) Int. Cl.
*G06F 16/14* (2019.01)
*G06F 16/22* (2019.01)
*G06F 16/23* (2019.01)
*G06F 16/242* (2019.01)
*G06F 16/2453* (2019.01)
*G06F 16/2455* (2019.01)
*G06F 16/2458* (2019.01)
*G06F 16/248* (2019.01)

(52) U.S. Cl.
CPC ...... *G06F 16/2282* (2019.01); *G06F 16/2315* (2019.01); *G06F 16/2428* (2019.01); *G06F 16/24568* (2019.01); *G06F 16/2471* (2019.01); *G06F 16/248* (2019.01)

(58) Field of Classification Search
CPC .... G06F 16/24; G06F 16/2428; G06F 9/4881; G06F 9/4825; G06F 9/505; G06F 11/2025; G06F 11/3476; G06F 16/2471; G06F 16/24568
See application file for complete search history.

(56) References Cited

U.S. PATENT DOCUMENTS

| | | | | |
|---|---|---|---|---|
| 8,024,744 | B2* | 9/2011 | Mayes | G06F 11/3476 |
| | | | | 719/314 |
| 8,214,359 | B1* | 7/2012 | Gomes | G06F 16/338 |
| | | | | 707/721 |
| 8,650,175 | B2* | 2/2014 | Hogue | G06F 16/951 |
| | | | | 707/706 |
| 11,157,324 | B2* | 10/2021 | Halim | G06F 9/4825 |
| 11,354,311 | B2* | 6/2022 | Stanley | G06F 16/24568 |
| 12,019,610 | B2* | 6/2024 | Arora | G06F 16/2358 |
| 12,118,003 | B2* | 10/2024 | Merker | G06F 16/24554 |
| 2006/0218123 | A1* | 9/2006 | Chowdhuri | G06F 16/24532 |
| 2006/0282422 | A1* | 12/2006 | Al-Omari | G06F 16/24544 |
| 2008/0059405 | A1* | 3/2008 | Barsness | G06F 16/2471 |
| 2009/0254916 | A1* | 10/2009 | Bose | G06F 9/5066 |
| | | | | 718/104 |
| 2010/0312762 | A1 | 12/2010 | Yan et al. | |
| 2011/0185358 | A1* | 7/2011 | Ostrovsky | G06F 9/4881 |
| | | | | 718/100 |
| 2012/0023092 | A1* | 1/2012 | Egan | G06F 16/24539 |
| | | | | 707/718 |
| 2015/0154256 | A1* | 6/2015 | McKenna | G06F 16/24542 |
| | | | | 707/718 |
| 2015/0169684 | A1* | 6/2015 | Li | G06F 16/24557 |
| | | | | 707/718 |
| 2018/0060395 | A1* | 3/2018 | Pathak | G06F 16/248 |
| 2019/0268398 | A1* | 8/2019 | Suriarachchi | H04L 65/1101 |
| 2020/0026624 | A1* | 1/2020 | Parthasarathy | G06F 11/2025 |
| 2022/0365931 | A1* | 11/2022 | Mehrotra | G06F 16/24532 |
| 2023/0030161 | A1* | 2/2023 | Bishop, III | G06F 9/5055 |

FOREIGN PATENT DOCUMENTS

| | | | |
|---|---|---|---|
| CN | 114265857 A | | 4/2022 |
| CN | 109145015 B | | 12/2022 |
| EP | 3114590 B1 | * | 12/2018 |
| WO | WO2008013632 A1 | * | 1/2008 |
| WO | WO 2011123255 A1 | * | 10/2011 |
| WO | WO2016165562 A1 | * | 10/2016 |
| WO | WO2019000386 A1 | * | 1/2019 |
| WO | 2021233261 A1 | | 11/2021 |

OTHER PUBLICATIONS

Narayanan, S et al., "Dynamic prioritization of database queries", 2011 IEEE 27th International Conference on Data Engineering (Apr. 2011, pp. 1232-1241).*

Chen yujun et al., "Research on Data Query Optimization Based on SparkSQL and MongoDB", Oct, 2018 17th International Symposium on Distributed Computing and Applications for Business Engineering and Science (DCABES).*

C. Mohan et al., "Parallelism in relational database management systems", IBM Systems Journal (Volume: 33, Issue: 2, 1994, pp. 349-371).*

Sadoghi, M et al., "Multi-query Stream Processing on FPGAs", IEEE 28th International Conference on Data Engineering, 2012, pp. 1229-1232.*

Extended EP Search Report issued in EP Appl. No. 24181948.1 on Dec. 12, 2024 (12 pages).

First Office Action for Chinese Application No. 202310857076.5, mailed on May 28, 2025, 14 pages.

* cited by examiner

QUERY TASK EXECUTION METHOD, APPARATUS, COMPUTER DEVICE AND STORAGE MEDIUM

CROSS-REFERENCE TO RELATED APPLICATIONS

This application claims the priority to and benefits of the Chinese Patent Application, No. 202310857076.5, which was filed on Jul. 13, 2023. The aforementioned patent application is hereby incorporated by reference in its entireties.

TECHNICAL FIELD

The present disclosure relates to the technical field of data processing, in particular to a query task execution method, an apparatus, a computer device and a storage medium.

BACKGROUND

In the scenario of executing query tasks, when the query task to be executed involves a large number of data tables, a multi-core central processing unit (CPU) architecture can be utilized to achieve concurrent execution.

Typically, to ensure concurrent execution, it is often necessary to increase or decrease the operators used for executing query tasks so as to increase or decrease the degree of parallelism of the operators. However, adjusting the degree of parallelism of the operators may not necessarily improve overall query efficiency; instead, it could lead to increased resource consumption and cause prolonged query latency.

SUMMARY

Embodiments of the present disclosure at least provide a query task execution method, an apparatus, a computer device and a storage medium.

In a first aspect, embodiments of the present disclosure provide query task execution method, including:
receiving a query task for a target data table;
determining at least one candidate degree of parallelism for executing the query task based on a first number of child tables obtained by pre-partitioning the target data table, the candidate degree of parallelism being used to indicate a second number of computing units required to execute the query task, and the first number being a multiple of the second number;
selecting a target degree of parallelism within a preset range of degrees of parallelism from the at least one candidate degree of parallelism, the preset range of degrees of parallelism being determined based on a number of cores of a central processing unit (CPU); and
determining required computing units according to the target degree of parallelism, and evenly allocating the child tables to the required computing units, the required computing units concurrently executing the query task based on the allocated child tables.

Combining the first aspect, embodiments of the present disclosure provide a first possible implementation of the first aspect, in which the query task targets multiple target data tables;
the step of determining at least one candidate degree of parallelism for executing the query task based on a first number of child tables obtained by pre-partitioning the target data table includes:
for each target data table of the multiple target data tables, determining at least one candidate degree of parallelism corresponding to the target data table based on a first number of child tables obtained by pre-partitioning the target data table; and
the step of selecting a target degree of parallelism within the preset range of degrees of parallelism from the at least one candidate degree of parallelism includes:
determining a range of target degrees of parallelism based on preset ranges of degrees of parallelism corresponding to each target data table of the multiple target data tables, the range of target degrees of parallelism being an intersection of preset ranges of parallelism corresponding to each of the target data tables; and
selecting a target degree of parallelism within the range of target degrees of parallelism from the candidate degrees of parallelism corresponding to each of target data tables.

Combining the first aspect, embodiments of the present disclosure provide a second possible implementation of the first aspect, in which multiple query tasks are provided;
concurrent execution of the query tasks by the computing units includes:
acquiring predicted execution duration corresponding to each of the query tasks, the predicted execution duration being related to a target data table that the query task targets;
determining initial priority levels of each of the query tasks based on the predicted execution duration;
determining an adjustment mode of the initial priority levels based on the target degrees of parallelism corresponding to each of the query tasks in response to a memory resource occupancy rate reaching a first set threshold, the adjustment mode including raising or lowering the initial priority levels;
adjusting the initial priority levels according to the adjustment mode to obtain adjusted priority levels; and
scheduling each of the query tasks according to the adjusted priority levels, and concurrently executing the query tasks by the computing units.

Combining the second possible implementation of the first aspect, embodiments of the present disclosure provide a third possible implementation of the first aspect, in which the step of acquiring predicted execution duration corresponding to each of the query tasks includes:
acquiring sub-predicted running duration of the computing units allocated to the plurality of target data tables under the query tasks, the sub-predicted running duration being related to a child table that a corresponding computing unit targets; and
determining the predicted execution duration corresponding to the query task based on the sub-predicted running duration of each of the computing units.

Combining the second possible implementation of the first aspect, embodiments of the present disclosure provide a fourth possible implementation of the first aspect, in which the step of determining an adjustment mode of the initial priority levels based on the target degrees of parallelism corresponding to each of the query tasks includes:
determining an adjustment coefficient for adjusting the initial priority levels of each of the query tasks based on the target degrees of parallelism and the number of cores of the CPU; and
determining a priority level number for adjusting the initial priority levels based on the predicted execution duration and the adjustment coefficient.

Combining the second possible implementation, the third possible implementation or the fourth possible implementation of the first aspect, embodiments of the present disclosure provide a fifth possible implementation of the first aspect, in which the step of scheduling each of the query tasks according to the adjusted priority levels includes:

performing round-robin scheduling on each of the query tasks according to the adjusted priority levels and a preset scheduling cycle until an execution of any query task is completed, then deleting the completed query task, re-determining the adjusted priority levels of remaining query tasks, and returning to the step of performing the round-robin scheduling on each of the query tasks.

Combining the first aspect, embodiments of the present disclosure provide a sixth possible implementation of the first aspect, in which the method further includes:

in response to receiving query tasks to be executed, if it is determined that a current memory resource occupancy rate reaches a second set threshold, sorting the query tasks to be executed according to receiving time of the query tasks to be executed, and then writing the query tasks to be executed into a task queue, the query tasks to be executed in the task queue being scheduled and executed in sequence when the memory resource occupancy rate is less than the second set threshold.

Combining the first aspect, embodiments of the present disclosure provide a seventh possible implementation of the first aspect, in which the method further includes:

detecting whether the memory resource occupancy rate reaches a third set threshold according to a preset detection cycle, the third set threshold being greater than the second set threshold; and in response to the memory resource occupancy rate reaching the third set threshold, pausing the execution of a currently running query task or writing the currently running query task back to the task queue.

In a second aspect, embodiments of the present disclosure further provide a query task execution apparatus, including:

a receiving module configured to receive a query task for a target data table;

a determination module configured to determine at least one candidate degree of parallelism for executing the query task based on a first number of child tables obtained by pre-partitioning the target data table, the candidate degree of parallelism being used to indicate a second number of computing units required to execute the query task, and the first number being a multiple of the second number;

a selection module configured to select a target degree of parallelism within a preset range of degrees of parallelism from the at least one candidate degree of parallelism, the preset range of degrees of parallelism being determined based on a number of cores of a CPU; and an execution module configured to determine required computing units according to the target degree of parallelism, and evenly allocate the child tables to the required computing units, the required computing units concurrently executing the query task based on the allocated child tables.

In a third aspect, embodiments of the present disclosure further provide a computer device, including a processor, a memory and a bus, wherein the memory stores machine-readable instructions executable by the processor; when the computer device runs, the processor communicates with the memory through the bus; and when the machine-readable instructions are executed by the processor, the steps of the query task execution method according to the first aspect or any possible implementation in the first aspect are executed.

In a fourth aspect, embodiments of the present disclosure further provide computer-readable storage medium, wherein a computer program is stored on the computer-readable storage medium, and when the computer program is executed by a processor, the steps of the query task execution method according to the first aspect or any possible implementation in the first aspect are executed.

According to the query task execution method provided by embodiments of the present disclosure, candidate degrees of parallelism for executing a query task are determined based on a first number of child tables obtained by pre-partitioning a target data table, that is, the divisor of the first number of the child tables obtained by pre-partitioning the target data table can be taken as a second number of computing units required for executing the query task, that is, the first number is a multiple of the second number, so that even allocation of the child tables can be realized. This avoids introducing additional data exchange operators when child tables cannot be evenly allocated to computing units, thereby reducing the memory resource consumption resulting from the introduction of additional data exchange operators and decreasing query latency. In addition, a preset range of degrees of parallelism for selecting a target degree of parallelism is determined based on the number of cores of a CPU, so that a target degree of parallelism better matching the number of cores of the CPU (typically half the number of cores) can be selected, thereby improving the utilization rate of CPU resources.

In order to make the above objects, features and advantages of the disclosure more evident and comprehensible, the following detailed description is provided, illustrating exemplary embodiments and accompanied by the attached drawings.

BRIEF DESCRIPTION OF DRAWINGS

In order to provide a clearer explanation of the technical solution of the disclosed embodiments, a brief introduction will be given below to the accompanying drawings required in the embodiments. The accompanying drawings are incorporated into the specification and form a part of the specification. These drawings illustrate embodiments that comply with the present disclosure and are used together with the specification to illustrate the technical solution of the present disclosure. It should be understood that the following drawings only illustrate certain embodiments of the present disclosure, and therefore should not be regarded as limiting the scope. For those skilled in the art, other relevant drawings can be obtained based on these drawings without inventive effort.

DETAILED DESCRIPTION

Figure 1:
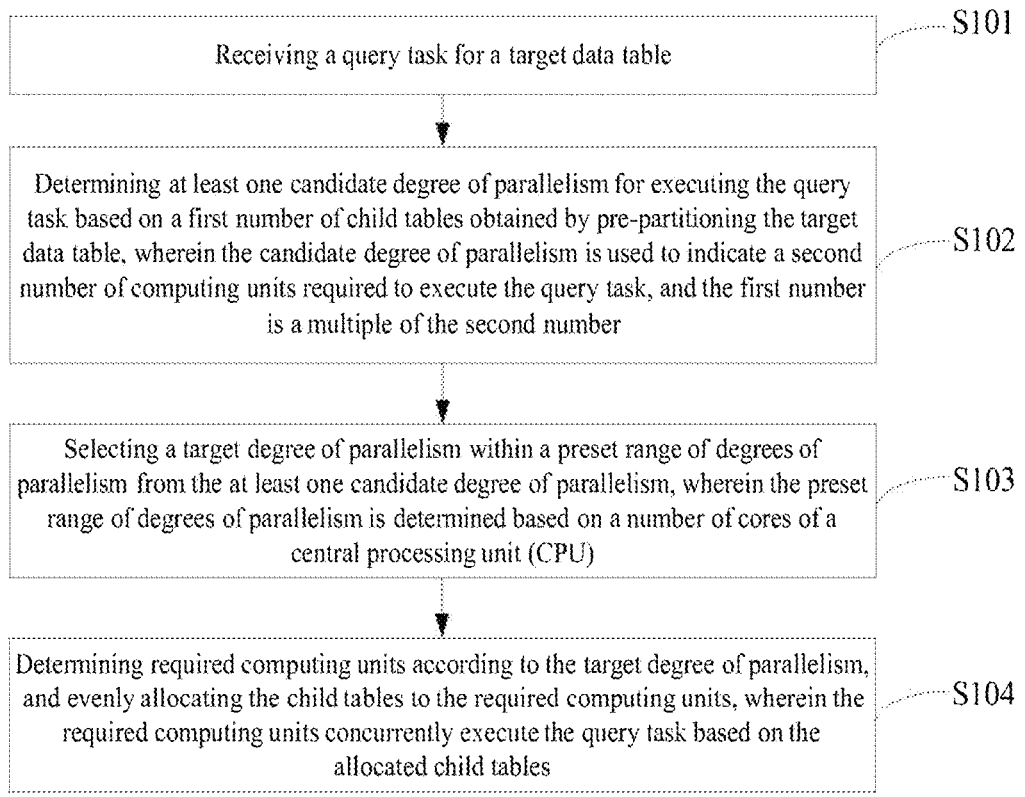
FIG. 1 is a flow diagram of a query task execution method according to embodiments of the present disclosure.

In order to clarify the purpose, technical solution, and advantages of the disclosed embodiments, the following will provide a clear and complete description of the technical solution in the disclosed embodiments in conjunction with the accompanying drawings. Obviously, the described embodiments are only a part of the disclosed embodiments, not all of them. The components of the disclosed embodiments described and illustrated in the accompanying drawings may be arranged and designed in various different configurations. Therefore, the detailed description of the embodiments provided in the accompanying drawings is not intended to limit the scope of the present disclosure, but only to represent the selected embodiments of the present disclosure. Based on the disclosed embodiments, all other embodiments obtained by those skilled in the art without creative labor fall within the scope of protection of this disclosure.

In the scenario of executing query tasks, when the query task to be executed involves a large number of data tables, a multi-core CPU architecture can be utilized to achieve concurrent execution.

Typically, to ensure concurrent execution, it is often necessary to increase or decrease the number of operators used for executing query tasks so as to increase or decrease the degree of parallelism of the operators. However, adjusting the degree of parallelism of the operators may not necessarily improve overall query efficiency; instead, it could lead to increased resource consumption and cause prolonged query latency.

Based on this, the present disclosure provides a query task execution method, where candidate degrees of parallelism for executing a query task are determined based on a first number of child tables obtained by pre-partitioning a target data table, that is, the divisor of the first number of the child tables obtained by pre-partitioning the target data table can be taken as a second number of computing units required for executing the query task, that is, the first number is a multiple of the second number, so that even allocation of the child tables can be realized. This avoids introducing additional data exchange operators when child tables cannot be evenly allocated to computing units, thereby reducing the memory resource consumption resulting from the introduction of additional data exchange operators and decreasing query latency. In addition, a preset range of degrees of parallelism for selecting a target degree of parallelism is determined based on the number of cores of a CPU, so that a target degree of parallelism better matching the number of cores of the CPU (typically half the number of cores) can be selected, thereby improving the utilization rate of CPU resources.

The defects identified in the above schemes and the proposed solutions are the results of the inventors' practice and careful study. Therefore, the discovery process of the above problems and the solutions proposed in this disclosure should all be considered as the contributions made by the inventors in this disclosure process.

It should be noted that similar reference numerals and letters indicate similar items in the following figures, so once an item is defined in one figure, it will not be further defined and explained in subsequent figures.

It can be understood that before using the technical schemes disclosed in several embodiments of the present disclosure, users should be informed of the types, scope of use and usage scenarios of personal information involved in the present disclosure in an appropriate way in accordance with relevant laws and regulations, and user authorization is required.

To facilitate the understanding of the embodiments, firstly, a query task execution method disclosed in an embodiment of the present disclosure is introduced in detail.

The executive subject of the query task execution method provided in this embodiment of the present disclosure is generally a computer device with certain computing power.

Next, the query task execution method provided by the embodiment of the present disclosure will be explained by taking a server as the executive subject.

Referring to FIG. 1 which is a flow diagram of a query task execution method according to embodiments of the present disclosure, the method includes S101 to S104.

In S101, a query task for a target data table is received.

The query task execution method provided by the embodiments of the present disclosure can be applied to complex query scenarios in which multiple users input queries. In the complex query scenarios, after receiving the queries input by each user, query tasks for each query can be obtained. The query tasks are used to query target data tables to obtain initial query results, and to aggregate and correlate the initial query results to obtain a final query result matching the queries.

Here, after receiving a query, a target data table related to the query can be identified. Each target data table can contain data under each column. Each column can correspond to one field information.

For example, if a user wishes to view the number of orders placed in the last 10 days, a target data table with fields including user name, order time, and order ID can be identified.

There is at least one target data table related to the query. In the above example, the target data table may be a data table with fields including user name, order time, and order ID. Alternatively, the target data tables may include a data table A with fields including user name and order ID and a data table B with fields including order time and order ID. The target data tables related to the query may also include other data tables, and the target data tables corresponding to different queries can be the same or different.

Each query task may involve multiple query operators or scan operators, and each scan operator can refer to an operation of querying a target data table.

In the embodiments of the present disclosure, in response to receiving a specified degree of parallelism from a user, the query tasks can be executed concurrently according to the specified degree of parallelism. In response to not receiving the specified degree of parallelism from the user, steps S102-S104 can be executed.

In response to not receiving the specified degree of parallelism from the user, candidate degrees of parallelism corresponding to each scan operator can be determined, which will be described in detail in S102 below.

In S102, at least one candidate degree of parallelism for executing the query task is determined based on a first number of child tables obtained by pre-partitioning the target data table, the candidate degree of parallelism being used to indicate a second number of computing units required to execute the query task, and the first number being a multiple of the second number.

Here, the target data table is stored in the form of child tables obtained by re-partitioning, and the child table can also be called a bucket. The child tables can have the same data size. However, multiple target data tables corresponding to the same query can correspond to different numbers of child tables obtained by partitioning. For example, some target data tables can be divided into four child tables with the same size, some target data tables can be divided into eight child tables with the same size, and some target data tables can be divided into sixteen child tables with the same size. The specific partitioning method for the target data table can be determined by the storage method, which is not specifically limited here.

The candidate degree of parallelism corresponding to each scan operator can be determined according to a first number of child tables obtained by pre-partitioning a target data table to be queried by the scan operator. Here, the candidate degree of parallelism can represent a second number of computing units required for executing the query task, that is, querying the target data table. When the query task is executed concurrently based on the candidate degree of parallelism, the child tables are evenly allocated to the computing units, which can eliminate memory resource consumption caused by the introduction of data exchange operators.

Here, the exchange operator can be local or global. Specifically, in a scenario where the exchange operator is local and aggregation is required for the initial query results of each child table, if there are 8 child tables to be scanned downstream while the degree of parallelism of the specified operator scanning the child tables upstream is 5, it is not possible to evenly allocate the 8 child tables to be scanned to 5 computing units (the degree of parallelism being 5 means requiring 5 computing units). In this case, additional exchange operators are required to further partition the excess 3 child tables to be scanned into smaller ones, and then the child tables are allocated to the 5 computing units. The process of further partitioning the 3 child tables to be scanned involves operations such as replication and splitting, leading to increased memory resource consumption. In a scenario where the exchange operator is global, that is, the degrees of parallelism of two computing nodes for data exchange do not match (e.g., one computing node has a degree of parallelism of 4 and the other has a degree of parallelism of 8), additional exchange operators are required during data exchange of the two nodes to allow the degrees of parallelism of the two computing nodes to match, which will also increase memory resource consumption.

Here, in order to evenly allocate the child tables to the computing units, a divisor of the first number of the child tables can be determined, and then the determined divisor can be used as the candidate degree of parallelism.

For example, the first number of child tables obtained by partitioning the target data table is 8, and it can be determined that the divisors of 8 include 2, 4 and 8 (the divisor 1 is not considered here because it results in separate execution when the degree of parallelism equals 1, instead of concurrent execution). In this case, 2, 4 and 8 can be used as candidate degrees of parallelism.

It can be seen that the first number is a multiple of the second number. When the first number is a multiple of the second number, the child tables can be evenly allocated to the computing units. In this case, there is no need to add new exchange operators to reallocate those child tables that are not evenly allocated, so as to eliminate memory resource consumption caused by the introduction of new exchange operators.

In S103, a target degree of parallelism within a preset range of degrees of parallelism is selected from the at least one candidate degree of parallelism, the preset range of degrees of parallelism being determined based on a number of cores of a CPU.

In the process of selecting the target degree of parallelism, screening conditions can be set, that is, the target degree of parallelism can be within the preset range of degrees of parallelism. By setting such screening conditions, the selected target degree of parallelism can be closer to an initial degree of parallelism. Here, the initial degree of parallelism can be determined according to the number of cores of the CPU.

In an implementation, one-half of the number of cores of the CPU can be taken as the initial degree of parallelism. For example, if the number of cores of the CPU is 8, the initial degree of parallelism can be 4.

Then the preset range of degrees of parallelism can be set according to the initial degree of parallelism. Specifically, a floating value can be set, and the preset range of degrees of parallelism can be a range of degrees of parallelism obtained by adding and subtracting the floating value from the initial degree of parallelism.

Figure 2:
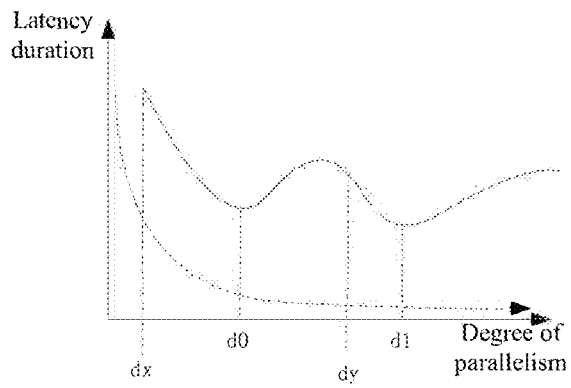
FIG. 2 is a schematic diagram showing the change of query latency with degrees of parallelism according to embodiments of the present disclosure.

For example, if the initial degree of parallelism is set to 4 and the floating value is set to 1, the preset range of degrees of parallelism can be (3, 5). Since the degree of parallelism is a positive integer, if the candidate degrees of parallelism include 2, 4 and 8, 4 can be selected as the target degree of parallelism. FIG. 2 is a schematic diagram showing the change of query latency with degree of parallelism. When the candidate degrees of parallelism are d0 and d1, there is no new exchange operator, and the query latency is relatively low. In order to select a target degree of parallelism better matching the initial degree of parallelism, the preset range of degrees of parallelism can be determined as (dx, dy) according to the floating value of 1, and then d0 can be selected as the target degree of parallelism.

In a case where the query task targets multiple target data tables, that is, the query task corresponds to multiple scan operators, the target degrees of parallelism corresponding to each scan operator can be determined according to S102 and S103, and then a target degree of parallelism is selected from the multiple target degrees of parallelism that meets the requirement that no exchange operator is introduced for any scan operator.

In an implementation, when the step of determining the candidate degrees of parallelism for executing the query task based on the first number of child tables obtained by partitioning the target data table is executed, for each of the target data tables, candidate degrees of parallelism corresponding to the target data table can be determined based on the first number of data tables obtained by partitioning the target data table.

That is, the candidate degrees of parallelism corresponding to each of the target data tables can be determined. For example, for the target data table 1, it can be determined that the corresponding candidate degrees of parallelism include 2, 4 and 8; for the target data table 2, it can be determined that the corresponding candidate degrees of parallelism include 2, 3, 4 and 12; and for the target data table 3, it can be determined that the corresponding candidate degrees of parallelism include 2, 4, 8 and 16.

Therefore, when the step of selecting the target degree of parallelism within the preset range of degrees of parallelism from the at least one candidate degree of parallelism is executed, a range of target degrees of parallelism can be determined based on preset ranges of degrees of parallelism corresponding to each of the target data tables, where the range of target degrees of parallelism is an intersection of the preset ranges of degrees of parallelism corresponding to each of the target data tables; and then a target degree of parallelism within the range of target degrees of parallelism is selected from the candidate degrees of parallelism corresponding to each of target data tables.

Here, in order to select a target degree of parallelism that can meet the requirements of each scan operator, the intersection of the preset ranges of degrees of parallelism, that is, the range of target degrees of parallelism, can be determined according to each preset range of degrees of parallelism, and then a target degree of parallelism within the range of target degrees of parallelism can be selected from the candidate degrees of parallelism corresponding to each of the target data tables. This can reduce the memory resource consumption caused by the introduction of an exchange operator when different scan operators correspond to different degrees of parallelism.

In S104, the required computing units are determined according to the target degree of parallelism, and the child tables are evenly allocated to the computing units, the computing units concurrently executing the query task based on the allocated child tables.

Here, according to the determined computing units, the child tables can be evenly allocated to the computing units, that is, the numbers of child tables corresponding to each computing unit are the same. In this case, it is unnecessary to introduce an exchange operator to further partition the child tables that are not evenly allocated, thus reducing the memory resource consumption caused by the introduction of an exchange operator.

As mentioned above, query tasks involving multiple queries can be obtained, that is, multiple query tasks can be provided. In this case, in order to ensure the fair scheduling of the multiple query tasks, in an implementation, predicted execution duration corresponding to each query task can be obtained. The predicted execution duration is related to a target data table that the query task targets. Specifically, the predicted execution duration can be related to the data size, quantity and other attributes of the queried target data tables. For example, the more the target data tables, the longer the predicted execution duration; and the larger the data size of the target data table, the longer the predicted execution duration.

In concrete implementation, one query task can target multiple target data tables. Therefore, when the step of acquiring the predicted execution duration corresponding to each query task is executed, sub-predicted running duration of the computing units allocated to the plurality of target data tables under the query tasks can be acquired. The sub-predicted running duration is related to a child table that a corresponding computing unit targets.

Specifically, the sub-predicted running duration can be related to the data size and other attributes of the queried child table. For example, the larger the data size of the child table, the longer the sub-predicted running duration.

Then the predicted execution duration corresponding to the query task can be determined based on the sub-predicted running duration of each of the computing units.

Here, a cumulative result of the sub-predicted running duration of each computing unit can be taken as the predicted execution duration corresponding to the query task.

After obtaining the predicted execution duration corresponding to each query task, initial priority levels of each of the query tasks can be determined based on the predicted execution duration.

In the embodiments of the present disclosure, the longer the predicted execution duration, the lower the determined initial priority level. This is because the longer the predicted execution duration is, the longer the memory resources are occupied. In order to ensure that the query task with short predicted execution duration (that is, the time of occupying the memory resources is short) is executed first, the initial priority level determined for the query task with longer predicted execution duration is lower.

When the memory resource occupancy rate is low, specifically, when the memory resource occupancy rate does not reach a first set threshold, the query tasks can be scheduled in sequence according to the initial priority levels.

When the memory resource occupancy rate is high, specifically, when the memory resource occupancy rate reaches the first set threshold, an adjustment mode of the initial priority levels can be determined based on the target degrees of parallelism corresponding to each of the query tasks. The adjustment mode may include raising or lowering the initial priority levels.

Then the initial priority levels are adjusted according to the adjustment mode to obtain adjusted priority levels, each of the query tasks is scheduled according to the adjusted priority levels, and the query tasks are concurrently executed by the computing units.

Here, when the memory resource occupancy rate reaches the first set threshold, it means that there is memory resource competition among the multiple query tasks.

In concrete implementation, the initial priority level corresponding to the query task with a high target degree of parallelism can be lowered. This is because the higher the target degree of parallelism is, the more memory resources are occupied. In order to ensure that the query task with a low target degree of parallelism (that is, fewer memory resources are occupied) is executed first, the initial priority level corresponding to the query task with a low target degree of parallelism can be lowered.

In a feasible implementation, when the step of determining the adjustment mode of the initial priority levels based on the target degrees of parallelism corresponding to each of the query tasks is executed, an adjustment coefficient for adjusting the initial priority levels of each of the query tasks can be determined based on the target degrees of parallelism and the number of cores of the CPU; and a priority level number for adjusting the initial priority levels is determined based on the predicted execution duration and the adjustment coefficient.

In the above implementation, the adjustment coefficient p-priority can be determined according to the following formula:

$$p\_priority = \max(1, dop/(num\_cores) * 0.5).$$

Here, dop represents the target degree of parallelism, and num_cores represents the number of cores of the CPU. This formula indicates that the maximum value of the ratio between 1 or the target degree of parallelism and half the number of cores of the CPU is selected as the adjustment coefficient for the initial priority levels.

Then the product of the predicted execution duration t_cpu and the adjustment coefficient is used to determine the priority level number for adjusting the priority levels. Specifically, the product can be used as the adjusted priority level.

In an implementation, in the process of scheduling each of the query tasks according to the adjusted priority levels, round-robin scheduling can be performed on each of the query tasks according to the adjusted priority levels and a preset scheduling cycle until the execution of any query task is completed, then the completed query task is deleted, the adjusted priority levels of the remaining query tasks are re-determined, and the step of performing round-robin scheduling on each of the query tasks is executed again.

In the above implementation, by performing round-robin scheduling on each of the query tasks according to the adjusted priority levels and the preset scheduling cycle, the fair scheduling of the query tasks can be realized, that is, the scheduling duration for each query task is the same. This avoids the situation where the query task B can be executed only after the query task A is executed, causing excessive delays in query task execution. For example, if the predicted execution duration of the query task A is 100 seconds and the predicted execution duration of the query task B is 1 second, when round-robin scheduling is performed on the query task A and the query task B, it takes 2 seconds to finish the execution of the query task B; however, if the query task B is executed after the query task A is executed, it takes 101 seconds to finish the execution of the query task B. Obviously, adopting the scheduling approach of completing the query task A before executing the query task B is more likely to result in significant delays for the query task B.

Because the predicted execution duration of each query task is different, some query tasks may be completed first, and some query tasks may be completed later. In the process of executing the query tasks, after any query task is executed, it can be deleted, and then the adjusted priority levels of the remaining query tasks can be re-determined. The adjusted priority levels of the remaining query tasks can be the adjusted priority levels of the remaining ongoing query tasks after removing the completed ones from ongoing query tasks, or the adjusted priority levels of the remaining ongoing query tasks plus newly added query tasks.

In the embodiments of the present disclosure, after receiving a query task to be executed, the query task to be executed can also be managed according to the memory resource occupancy rate.

In an implementation, in response to receiving query tasks to be executed, if it is determined that the current memory resource occupancy rate does not reach a second set threshold, that is, the memory resources are abundant, each query task can be executed according to the determined priority level.

In an implementation, in response to receiving query tasks to be executed, if it is determined that the current memory resource occupancy rate reaches the second set threshold, the query tasks to be executed are sorted according to receiving time of the query tasks to be executed, and then the query tasks to be executed are written into a task queue. Here, the query tasks to be executed in the task queue are scheduled and executed in sequence when the memory resource occupancy rate is less than the second set threshold.

Here, the current memory resource occupancy rate reaching the second set threshold indicates memory resource contention, so each query task to be executed can be written into the task queue. Specifically, the query tasks to be executed can be sorted according to the receiving time of the query tasks to be executed and then written into the task queue. In this way, the query tasks received earlier can be put at the forefront of the task queue, enabling their execution first, while the query tasks received later can be positioned at the end of the task queue, facilitating their execution subsequently.

When the memory resource occupancy rate is less than the second set threshold, the query tasks to be executed in the task queue can be scheduled and executed in sequence. When the memory resource occupancy rate is greater than or equal to the second set threshold, the query tasks to be executed in the task queue can wait until the memory resource occupancy rate is less than the second set threshold.

To prevent complete depletion of the memory resources, in an implementation, whether the memory resource occupancy rate reaches a third set threshold can be detected according to a preset detection cycle. Here, the third set threshold is greater than the second set threshold. In response to the memory resource occupancy rate reaching the third set threshold, the execution of a currently running query task is paused or the currently running query task is written back to the task queue.

Here, by detecting whether the memory resource occupancy rate reaches the third set threshold according to the preset detection cycle, whether the memory resources are exhausted can be found out in time. When the memory resource occupancy rate reaches the third set threshold, some memory resources can be released by pausing the execution of a currently running query task or writing the currently running query task back to the task queue, thus avoiding complete depletion of the memory resources.

It can be understood by those skilled in the art that in the above-mentioned method according to specific implementations, the order of writing the steps does not necessarily imply a strict execution sequence or impose any limitations on the implementation process. The specific execution sequence of each step should be determined based on its functionality and possible inherent logic.

Based on the same inventive concept, the embodiments of the present disclosure also provide a query task execution apparatus corresponding to the query task execution method. Since the principle of solving problems by the apparatus in the embodiments of the present disclosure is similar to the above-mentioned query task execution method, the implementation of the method can be used as a reference for the implementation of the apparatus, which will not be repeated here.

Figure 3:
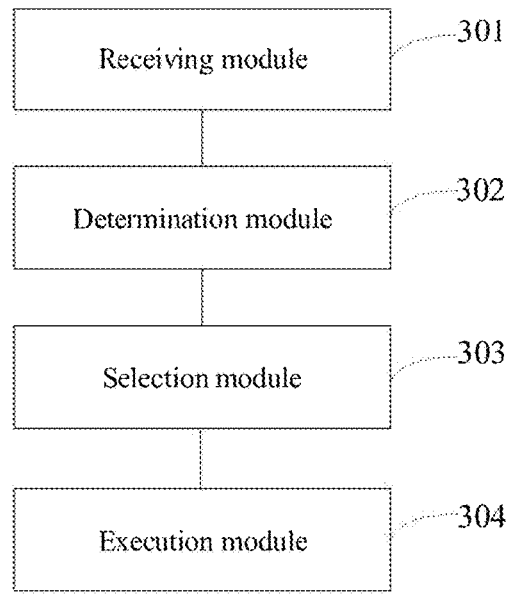
FIG. 3 is a structural diagram of a query task execution apparatus according to embodiments of the present disclosure.

FIG. 3 is a structural diagram of a query task execution apparatus according to embodiments of the present disclosure. The apparatus includes:

a receiving module 301 configured to receive a query task for a target data table;

a determination module 302 configured to determine at least one candidate degree of parallelism for executing the query task based on a first number of child tables obtained by pre-partitioning the target data table, the candidate degree of parallelism being used to indicate a second number of computing units required to execute the query task, and the first number being a multiple of the second number;

a selection module 303 configured to select a target degree of parallelism within a preset range of degrees of parallelism from the at least one candidate degree of parallelism, the preset range of degrees of parallelism being determined based on a number of cores of a CPU; and an execution module 304 configured to determine the required computing units according to the target degree of parallelism, and evenly allocate the child tables to the computing units, the computing units concurrently executing the query task based on the allocated child tables.

In a feasible implementation, the query task targets multiple target data tables;

the determination module 302 is specifically configured to:

for each of the target data tables, determine at least one candidate degree of parallelism corresponding to the target data table based on a first number of child tables obtained by pre-partitioning the target data table; and the selection module 303 is specifically configured to:
determine a range of target degrees of parallelism based on preset ranges of degrees of parallelism corresponding to each of the target data tables, the range of target degrees of parallelism being an intersection of the preset ranges of degrees of parallelism corresponding to each of the target data tables; and
select a target degree of parallelism within the range of target degrees of parallelism from the candidate degrees of parallelism corresponding to each of target data tables.

In a feasible implementation, multiple query tasks are provided; and
the execution module 304 is specifically configured to:
acquire predicted execution duration corresponding to each of the query tasks, the predicted execution duration being related to a target data table that the query task targets;
determine initial priority levels of each of the query tasks based on the predicted execution duration;
determine an adjustment mode of the initial priority levels based on the target degrees of parallelism corresponding to each of the query tasks in response to a memory resource occupancy rate reaching a first set threshold, the adjustment mode including raising or lowering the initial priority levels;
adjust the initial priority levels according to the adjustment mode to obtain adjusted priority levels; and
schedule each of the query tasks according to the adjusted priority levels, and concurrently execute the query tasks by the computing units.

In a feasible implementation, the execution module 304 is specifically configured to:
acquire sub-predicted running duration of the computing units allocated to the plurality of target data tables under the query tasks, the sub-predicted running duration being related to a child table that a corresponding computing unit targets; and
determine the predicted execution duration corresponding to the query task based on the sub-predicted running duration of each of the computing units.

In a feasible implementation, the execution module 304 is specifically configured to:
determine an adjustment coefficient for adjusting the initial priority levels of each of the query tasks based on the target degrees of parallelism and the number of cores of the CPU; and
determine a priority level number for adjusting the initial priority levels based on the predicted execution duration and the adjustment coefficient.

In a feasible implementation, the execution module 304 is specifically configured to:
perform round-robin scheduling on each of the query tasks according to the adjusted priority levels and a preset scheduling cycle until the execution of any query task is completed, then delete the completed query task, re-determine the adjusted priority levels of the remaining query tasks, and return to the step of performing round-robin scheduling on each of the query tasks.

In a feasible implementation, the apparatus further includes:
a writing module configured to, in response to receiving query tasks to be executed, if it is determined that a current memory resource occupancy rate reaches a second set threshold, sort the query tasks to be executed according to receiving time of the query tasks to be executed, and then write the query tasks to be executed into a task queue, the query tasks to be executed in the task queue being scheduled and executed in sequence when the memory resource occupancy rate is less than the second set threshold.

In a feasible implementation, the apparatus further includes:
a detection module configured to detect whether the memory resource occupancy rate reaches a third set threshold according to a preset detection cycle, the third set threshold being greater than the second set threshold; and
a processing module configured to, in response to the memory resource occupancy rate reaching the third set threshold, pause the execution of a currently running query task or write the currently running query task back to the task queue.

For the process flow of each module in the apparatus and the interactive process between modules, please refer to the relevant description in the above method embodiment, which will not be repeated here.

Figure 4:
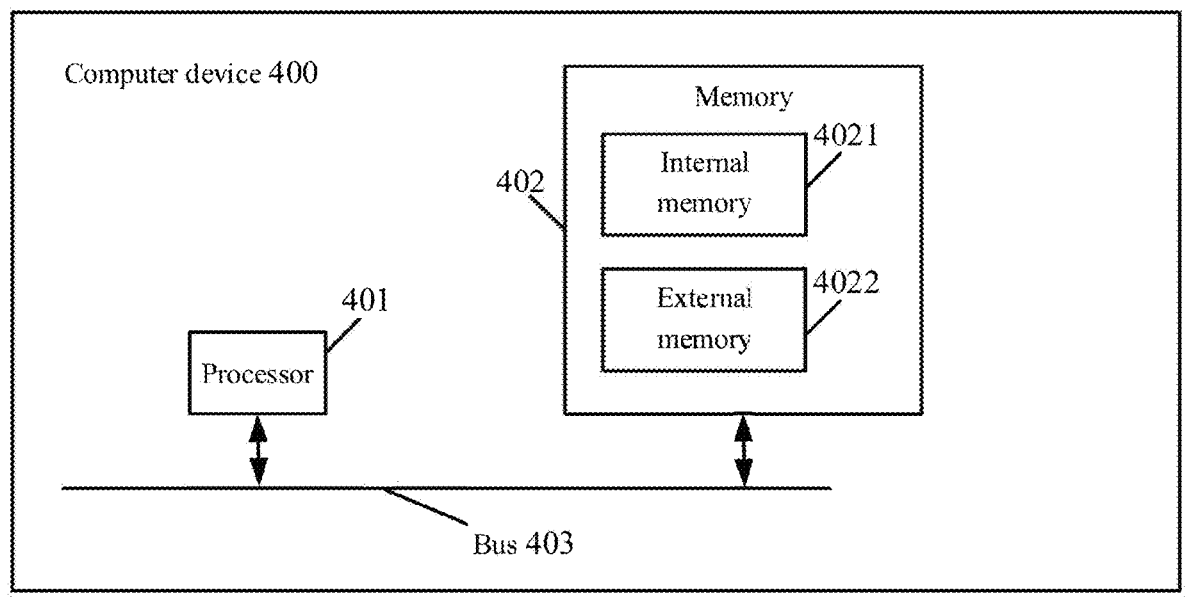
FIG. 4 is a schematic diagram of a computer device according to embodiments of the present disclosure.

Based on the same technical concept, the embodiments of the present disclosure also provide a computer device. Referring to FIG. 4 which a structural diagram of a computer device 400 according to embodiments of the present disclosure, the computer device includes a processor 401, a memory 402, and a bus 403. The memory 402 is used to store execution instructions, including an internal memory 4021 and the external memory 4022. Here, the internal memory 4021, also called internal storage, is used for temporarily storing operation data in the processor 401 and data exchanged with the external memory 4022 such as a hard disk drive. The processor 401 exchanges data with the external memory 4022 through the internal memory 4021. When the computer device 400 runs, the processor 401 communicates with the memory 402 through the bus 403, so that the processor 401 executes the following instructions:
receiving a query task for a target data table;
determining at least one candidate degree of parallelism for executing the query task based on a first number of child tables obtained by pre-partitioning the target data table, the candidate degree of parallelism being used to indicate a second number of computing units required to execute the query task, and the first number being a multiple of the second number;
selecting a target degree of parallelism within a preset range of degrees of parallelism from the at least one candidate degree of parallelism, the preset range of degrees of parallelism being determined based on a number of cores of a CPU; and
determining the required computing units according to the target degree of parallelism, and evenly allocating the child tables to the computing units, the computing units concurrently executing the query task based on the allocated child tables.

The embodiments of the present disclosure also provide a computer-readable storage medium, on which a computer program is stored, and when the computer program is run by a processor, the steps of the query task execution method described in the above method embodiment are executed. The storage medium can be a volatile or nonvolatile computer-readable storage medium.

The embodiments of the present disclosure also provide a computer program product, which carries a program code, and the program code includes instructions that can be used to execute the steps of the query task execution method described in the above method embodiment. For details, please refer to the above-mentioned method embodiment, which is not repeated here.

Among them, the above-mentioned computer program products can be specifically implemented through hardware, software, or a combination of them. In one optional embodiment, the computer program product is specifically embodied as a computer storage medium, while in other optional embodiments, the computer program products are specifically embodied as a software product, such as a Software Development Kit, SDK and so on.

Technicians in the field can clearly understand that for the convenience and conciseness of the description, the specific working process of the device described above can refer to the corresponding process in the aforementioned method implementation examples, and will not be repeated here. In the several embodiments provided in this disclosure, it should be understood that the disclosed devices and methods can be implemented in other ways. The device embodiments described above are only illustrative. For example, the division of units (or modules) is only a logical function division, and there may be other division methods in actual implementation. For example, multiple units or components can be combined or integrated into another system, or some features can be ignored or not executed. Another point is that the coupling or direct coupling or communication connection displayed or discussed between each other can be indirect coupling or communication connection through some communication interfaces, devices or units, which can be in the form of electrical, mechanical or other forms.

The units described as separate components can be or may not be physically separated, and the components displayed as units can be or may not be physical units, that is, they can be located in one place or distributed across multiple network units. Some or all units can be selected according to actual needs to achieve the purpose of this embodiment.

In addition, in the various embodiments disclosed herein, each functional unit can be integrated into one processing unit, each unit can exist physically alone, or two or more units can be integrated into one unit.

If the function is implemented in the form of a software functional unit and sold or used as an independent product, it can be stored in a non-volatile computer-readable storage medium that can be executed by a processor. Based on this understanding, the technical solution disclosed herein can essentially or in the form of a software product that contributes to the existing technology. The computer software product is stored in a storage medium and includes several instructions to enable a computer device (which can be a personal computer, server, or network device, etc.) to perform all or part of the steps of the methods described in the various embodiments disclosed herein. The aforementioned storage media include: USB flash drives, portable hard drives, Read Only Memory (ROM), Random Access Memory (RAM), and various media such as disks or CDs that can store program code.

Finally, it should be noted that the above embodiments are only specific embodiments of the present disclosure, used to illustrate the technical solution disclosed herein, and not to limit it. The scope of protection of the present disclosure is not limited to this. Although detailed explanations of the present disclosure have been made with reference to the aforementioned embodiments, ordinary technical personnel in the art should understand that any technical personnel familiar with the art can still modify or easily think of changes to the technical solution recorded in the aforementioned embodiments within the scope of the disclosed technology, or replace some of the technical features equally. These modifications, changes, or replacements do not make the essence of the corresponding technical solution deviate from the spirit and scope of the technical solution disclosed in this disclosure, and should be covered within the scope of protection of this disclosure. Therefore, the scope of protection disclosed in this disclosure shall be based on the scope of protection of the claimed rights.

The invention claimed is:

1. A query task execution method, applied to multi-core central processing unit architecture for executing a query task, comprising:

receiving the query task for a target data table, wherein the query task is executed by operators;

determining at least one candidate degree of parallelism for executing the query task based on a first number of child tables obtained by pre-partitioning the target data table, the candidate degree of parallelism being a value that is capable of being selected as a second number of computing units of the multi-core central processing unit architecture required to execute the query task, and the first number being a multiple of the second number;

selecting a target degree of parallelism within a preset range of degrees of parallelism from the at least one candidate degree of parallelism, the preset range of degrees of parallelism being determined based on a number of cores of a central processing unit (CPU), wherein the reset range of degrees of parallelism is set according to initial degree of parallelism, and the initial degree of parallelism is determined according to the number of cores of the CPU; and determining required computing units according to the target degree of parallelism, and evenly allocating the child tables to the required computing units, the required computing units concurrently executing the query task based on the allocated child tables in the multi-core central processing unit architecture, the target degree of parallelism being number of the required computing units that are determined, and the preset range of degrees of parallelism being used for selecting the target degree of parallelism, wherein multiple query tasks are provided, and wherein concurrent execution of the query tasks by the computing units comprises:

acquiring predicted execution duration corresponding to each of the query tasks, the predicted execution duration being related to a target data table that the query task targets;

determining initial priority levels of each of the query tasks based on the predicted execution duration;

determining an adjustment mode of the initial priority levels based on the target degrees of parallelism corresponding to each of the query tasks in response to a memory resource occupancy rate reaching a first set threshold, the adjustment mode comprising raising or lowering the initial priority levels;

adjusting the initial priority levels according to the adjustment mode to obtain adjusted priority levels; and scheduling each of the query tasks according to the adjusted priority levels, and concurrently executing the query tasks by the computing units.

2. The method according to claim 1, wherein the query task targets multiple target data tables;

the step of determining at least one candidate degree of parallelism for executing the query task based on a first number of child tables obtained by pre-partitioning the target data table comprises:

for each target data table of the multiple target data tables, determining at least one candidate degree of parallelism corresponding to the target data table based on a first number of child tables obtained by pre-partitioning the target data table; and the step of selecting a target degree of parallelism within the preset range of degrees of parallelism from the at least one candidate degree of parallelism comprises:

determining a range of target degrees of parallelism based on preset ranges of degrees of parallelism corresponding to each target data table of the multiple target data tables, the range of target degrees of parallelism being an intersection of preset ranges of degrees of parallelism corresponding to each of the target data tables; and selecting a target degree of parallelism within the range of target degrees of parallelism from the candidate degrees of parallelism corresponding to each of target data tables.

3. The method according to claim 1, wherein the step of acquiring predicted execution duration corresponding to each of the query tasks comprises:

acquiring sub-predicted running duration of the computing units allocated to the plurality of target data tables under the query tasks, the sub-predicted running duration being related to a child table that a corresponding computing unit targets; and determining the predicted execution duration corresponding to the query task based on the sub-predicted running duration of each of the computing units.

4. The method according to claim 1, wherein the step of determining an adjustment mode of the initial priority levels based on the target degrees of parallelism corresponding to each of the query tasks comprises:

determining an adjustment coefficient for adjusting the initial priority levels of each of the query tasks based on the target degrees of parallelism and the number of cores of the CPU; and determining a priority level number for adjusting the initial priority levels based on the predicted execution duration and the adjustment coefficient.

5. The method according to claim 1, wherein the step of scheduling each of the query tasks according to the adjusted priority levels comprises:

performing round-robin scheduling on each of the query tasks according to the adjusted priority levels and a preset scheduling cycle until an execution of any query task is completed, then deleting the completed query task, re-determining the adjusted priority levels of remaining query tasks, and returning to the step of performing the round-robin scheduling on each of the query tasks.

6. The method according to claim 1, further comprising:

in response to receiving query tasks to be executed, if it is determined that a current memory resource occupancy rate reaches a second set threshold, sorting the query tasks to be executed according to receiving time of the query tasks to be executed, and then writing the query tasks to be executed into a task queue, the query tasks to be executed in the task queue being scheduled and executed in sequence when the memory resource occupancy rate is less than the second set threshold.

7. The method according to claim 6, further comprising:

detecting whether the memory resource occupancy rate reaches a third set threshold according to a preset detection cycle, the third set threshold being greater than the second set threshold; and in response to the memory resource occupancy rate reaching the third set threshold, pausing the execution of a currently running query task or writing the currently running query task back to the task queue.

8. A computer device, applied to multi-core central processing unit architecture for executing a query task, comprising a processor, a memory and a bus, wherein the memory stores machine-readable instructions executable by the processor; when the computer device runs, the processor communicates with the memory through the bus; and wherein the machine-readable instructions upon execution by the processor, cause the processor to:

receive the query task for a target data table, wherein the query task is executed by operators;

determine at least one candidate degree of parallelism for executing the query task based on a first number of child tables obtained by pre-partitioning the target data table, the candidate degree of parallelism being a value that is capable of being selected as a second number of computing units of the multi-core central processing unit architecture required to execute the query task, and the first number being a multiple of the second number;

select a target degree of parallelism within a preset range of degrees of parallelism from the at least one candidate degree of parallelism, the preset range of degrees of parallelism being determined based on a number of cores of a central processing unit (CPU), wherein the reset range of degrees of parallelism is set according to initial degree of parallelism, and the initial degree of parallelism is determined according to the number of cores of the CPU; and determine required computing units according to the target degree of parallelism, and evenly allocate the child tables to the required computing units, the required computing units concurrently executing the query task based on the allocated child tables in the multi-core central processing unit architecture, the target degree of parallelism being number of the required computing units that are determined, and the preset range of degrees of parallelism being used for selecting the target degree of parallelism, wherein multiple query tasks are provided, and wherein concurrent execution of the query tasks by the computing units comprises:

acquiring predicted execution duration corresponding to each of the query tasks, the predicted execution duration being related to a target data table that the query task targets;

determining initial priority levels of each of the query tasks based on the predicted execution duration;

determining an adjustment mode of the initial priority levels based on the target degrees of parallelism corresponding to each of the query tasks in response to a memory resource occupancy rate reaching a first set threshold, the adjustment mode comprising raising or lowering the initial priority levels;

adjusting the initial priority levels according to the adjustment mode to obtain adjusted priority levels; and scheduling each of the query tasks according to the adjusted priority levels, and concurrently executing the query tasks by the computing units.

9. The computer device according to claim 8, wherein the query task targets multiple target data tables; and wherein the processor executing the step of determining at least one candidate degree of parallelism for executing the query task based on a first number of child tables obtained by pre-partitioning the target data table comprises:
for each target data table of the multiple target data tables, determining at least one candidate degree of parallelism corresponding to the target data table based on a first number of child tables obtained by pre-partitioning the target data table; and
the processor executing the step of selecting a target degree of parallelism within the preset range of degrees of parallelism from the at least one candidate degree of parallelism comprises:
determining a range of target degrees of parallelism based on preset ranges of degrees of parallelism corresponding to each target data table of the multiple target data tables, the range of target degrees of parallelism being an intersection of preset ranges of degrees of parallelism corresponding to each of the target data tables; and
selecting a target degree of parallelism within the range of target degrees of parallelism from the candidate degrees of parallelism corresponding to each of target data tables.

10. The computer device according to claim 8, wherein the processor executing the step of acquiring predicted execution duration corresponding to each of the query tasks comprises:
acquiring sub-predicted running duration of the computing units allocated to the plurality of target data tables under the query tasks, the sub-predicted running duration being related to a child table that a corresponding computing unit targets; and
determining the predicted execution duration corresponding to the query task based on the sub-predicted running duration of each of the computing units.

11. The computer device according to claim 8, wherein the processor executing the step of determining an adjustment mode of the initial priority levels based on the target degrees of parallelism corresponding to each of the query tasks comprises:
determining an adjustment coefficient for adjusting the initial priority levels of each of the query tasks based on the target degrees of parallelism and the number of cores of the CPU; and
determining a priority level number for adjusting the initial priority levels based on the predicted execution duration and the adjustment coefficient.

12. The computer device according to claim 8, wherein the processor executing the step of scheduling each of the query tasks according to the adjusted priority levels comprises:
performing round-robin scheduling on each of the query tasks according to the adjusted priority levels and a preset scheduling cycle until an execution of any query task is completed, then deleting the completed query task, re-determining the adjusted priority levels of remaining query tasks, and returning to the step of performing the round-robin scheduling on each of the query tasks.

13. The computer device according to claim 8, wherein the machine-readable instructions further cause the processor to:
in response to receiving query tasks to be executed, if it is determined that a current memory resource occupancy rate reaches a second set threshold, sort the query tasks to be executed according to receiving time of the query tasks to be executed, and then write the query tasks to be executed into a task queue, the query tasks to be executed in the task queue being scheduled and executed in sequence when the memory resource occupancy rate is less than the second set threshold.

14. The computer device according to claim 13, wherein the machine-readable instructions further cause the processor to:
detect whether the memory resource occupancy rate reaches a third set threshold according to a preset detection cycle, the third set threshold being greater than the second set threshold; and
in response to the memory resource occupancy rate reaching the third set threshold, pause the execution of a currently running query task or write the currently running query task back to the task queue.

15. A non-transitory computer-readable storage medium, applied to multi-core central processing unit architecture for executing a query task, wherein a computer program is stored on the non-transitory computer-readable storage medium, and wherein the computer program upon execution by a processor, cause the processor to:
receive the query task for a target data table, wherein the query task is executed by operators;
determine at least one candidate degree of parallelism for executing the query task based on a first number of child tables obtained by pre-partitioning the target data table, the candidate degree of parallelism being a value that is capable of being selected as a second number of computing units of the multi-core central processing unit architecture required to execute the query task, and the first number being a multiple of the second number;
select a target degree of parallelism within a preset range of degrees of parallelism from the at least one candidate degree of parallelism, the preset range of degrees of parallelism being determined based on a number of cores of a central processing unit (CPU), wherein the reset range of degrees of parallelism is set according to initial degree of parallelism, and the initial degree of parallelism is determined according to the number of cores of the CPU; and
determine required computing units according to the target degree of parallelism, and evenly allocate the child tables to the required computing units, the required computing units concurrently executing the query task based on the allocated child tables in the multi-core central processing unit architecture, the target degree of parallelism being number of the required computing units that are determined, and the preset range of degrees of parallelism being used for selecting the target degree of parallelism,
wherein multiple query tasks are provided, and wherein concurrent execution of the query tasks by the computing units comprises:
acquiring predicted execution duration corresponding to each of the query tasks, the predicted execution duration being related to a target data table that the query task targets;
determining initial priority levels of each of the query tasks based on the predicted execution duration;
determining an adjustment mode of the initial priority levels based on the target degrees of parallelism corresponding to each of the query tasks in response to a memory resource occupancy rate reaching a first set threshold, the adjustment mode comprising raising or lowering the initial priority levels;
adjusting the initial priority levels according to the adjustment mode to obtain adjusted priority levels; and scheduling each of the query tasks according to the adjusted priority levels, and concurrently executing the query tasks by the computing units.

16. The non-transitory computer-readable storage medium according to claim 15, wherein the query task targets multiple target data tables; and wherein the processor executing the step of determining at least one candidate degree of parallelism for executing the query task based on a first number of child tables obtained by pre-partitioning the target data table comprises:

for each target data table of the multiple target data tables, determining at least one candidate degree of parallelism corresponding to the target data table based on a first number of child tables obtained by pre-partitioning the target data table; and the processor executing the step of selecting a target degree of parallelism within the preset range of degrees of parallelism from the at least one candidate degree of parallelism comprises:

determining a range of target degrees of parallelism based on preset ranges of degrees of parallelism corresponding to each target data table of the multiple target data tables, the range of target degrees of parallelism being an intersection of preset ranges of degrees of parallelism corresponding to each of the target data tables; and selecting a target degree of parallelism within the range of target degrees of parallelism from the candidate degrees of parallelism corresponding to each of target data tables.

17. The non-transitory computer-readable storage medium according to claim 15, wherein the processor executing the step of acquiring predicted execution duration corresponding to each of the query tasks comprises:

acquiring sub-predicted running duration of the computing units allocated to the plurality of target data tables under the query tasks, the sub-predicted running duration being related to a child table that a corresponding computing unit targets; and determining the predicted execution duration corresponding to the query task based on the sub-predicted running duration of each of the computing units.

* * * * *